US012664613B2

(12) United States Patent
Berbecel et al.

(10) Patent No.: US 12,664,613 B2
(45) Date of Patent: Jun. 23, 2026

(54) HYBRID VIDEO RESOLUTION METHOD AND APPARATUS

(71) Applicant: Avago Technologies International Sales Pte. Limited, Singapore (SG)

(72) Inventors: Gheorghe Berbecel, Irvine, CA (US); Richard Hayden Wyman, Sunnyvale, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 18/790,655

(22) Filed: Jul. 31, 2024

(65) Prior Publication Data

US 2026/0038085 A1 Feb. 5, 2026

(51) Int. Cl.
| | |
|---|---|
| *G06T 3/4053* | (2024.01) |
| *G06T 3/4046* | (2024.01) |
| *H04N 7/01* | (2006.01) |

(52) U.S. Cl.
CPC .......... *G06T 3/4053* (2013.01); *G06T 3/4046* (2013.01); *H04N 7/0117* (2013.01)

(58) Field of Classification Search
CPC .... G06T 3/4053; G06T 3/4046; H04N 7/0117
See application file for complete search history.

(56) References Cited

U.S. PATENT DOCUMENTS

| | | | |
|---|---|---|---|
| 10,574,936 B2 | 2/2020 | Wu et al. | |
| 11,496,798 B2 | 11/2022 | Walls et al. | |
| 11,900,897 B2 | 2/2024 | Wu et al. | |
| 12,211,214 B2 * | 1/2025 | Jhang | G06T 7/12 |
| 2019/0124488 A1 * | 4/2019 | Ellis | G06F 13/1668 |
| 2020/0043135 A1 * | 2/2020 | Chou | G06T 1/20 |
| 2021/0125310 A1 * | 4/2021 | Pu | G06T 5/60 |
| 2021/0266496 A1 * | 8/2021 | Qin | H04N 5/144 |
| 2022/0292636 A1 * | 9/2022 | Chen | G06N 3/0464 |
| 2023/0005104 A1 * | 1/2023 | Pasupuleti | G06T 3/4053 |
| 2023/0040176 A1 * | 2/2023 | Bau | G06N 3/0475 |
| 2023/0098437 A1 | 3/2023 | Li et al. | |
| 2023/0282133 A1 * | 9/2023 | DiMauro | G09B 23/02 |
| | | | 434/188 |
| 2024/0020791 A1 * | 1/2024 | Bao | G06N 3/02 |
| 2024/0155070 A1 * | 5/2024 | Liu | H04N 7/0117 |
| 2024/0242309 A1 * | 7/2024 | Shi | G06T 3/4046 |
| 2025/0037238 A1 * | 1/2025 | Kulikov | G06N 3/0464 |
| 2025/0077858 A1 * | 3/2025 | Berbecel | G06N 3/063 |

(Continued)

OTHER PUBLICATIONS

Extended European Search Report on Appln. No. EP25192796.8 dated Dec. 1, 2025.

(Continued)

*Primary Examiner* — John R Schnurr

(74) *Attorney, Agent, or Firm* — Foley & Lardner LLP

(57) ABSTRACT

In some respects, the disclosure is directed to methods and systems for processing signals. A device can include a first circuit configured to process video information for a resolution or scaling operation and provide first data, a second circuit configured to process the video information for the resolution or scaling operation and provide second data, and a third circuit configured to receive the first data and the second data and provide third data according to the resolution or scaling operation, the first circuit comprising a first machine learning engine.

18 Claims, 6 Drawing Sheets

(56)  References Cited

U.S. PATENT DOCUMENTS

2025/0117882 A1\*  4/2025  Milanfar  ............... G06T 3/4046
2025/0166122 A1\*  5/2025  Francisco  ............. G06T 3/4007

OTHER PUBLICATIONS

Gu et al. "Super-Resolution by Predicting Offsets: An Ultra-Efficient Super-Resolution Network for Rasterized Images", Springer International Publisher, pp. 583-598, dated Nov. 9, 2022.

\* cited by examiner

HYBRID VIDEO RESOLUTION METHOD AND APPARATUS

FIELD OF THE DISCLOSURE

This disclosure generally relates to systems for and methods of providing video or images including but not limited to providing digital video or images having a greater resolution than the input resolution (e.g., super resolution) or size than the input size.

BACKGROUND OF THE DISCLOSURE

Video signals are provided in a variety of formats and convey video information. The video information can be provided using a range of luminance values or brightness of pixels, and a range of color values for the pixels. The pixels are displayed on any of a multitude of display devices. Display size and display resolution are often different than the size and resolution provided by the video signals from a source, storage, or hub providing the video signals. Converting the video signals to a particular size or resolution can require large areas of silicon, high amounts of power being consumed, and large memory bandwidth to constantly and efficiently convert data associated with the video signals.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

Figure 1:
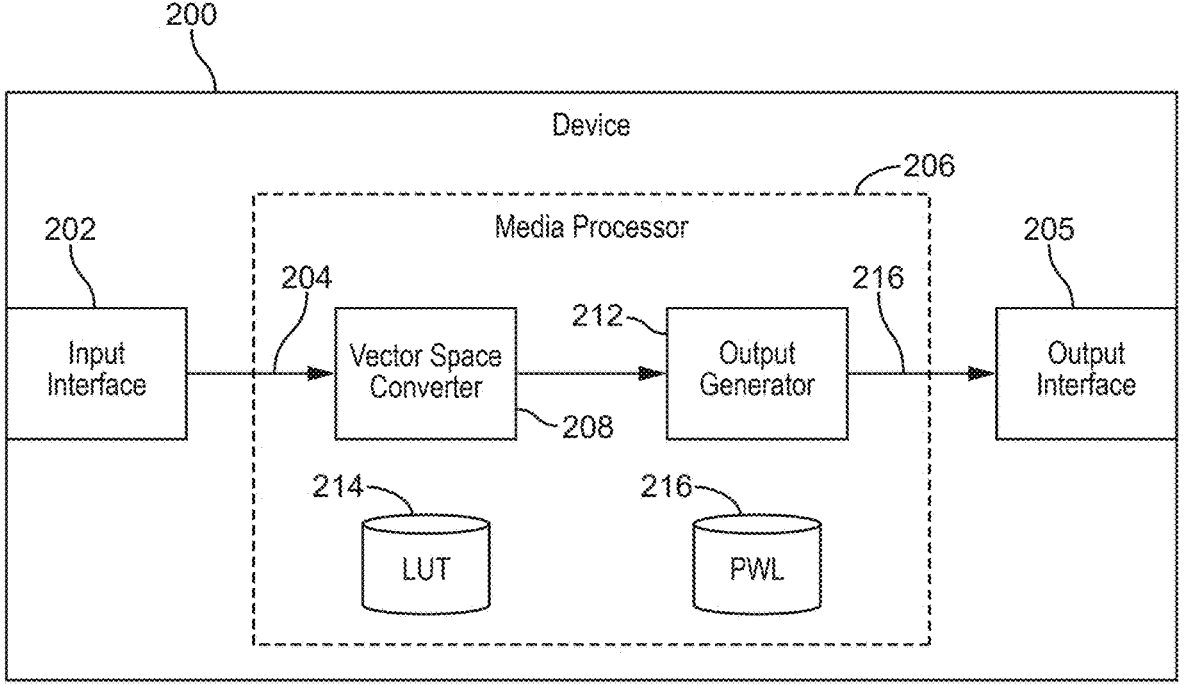
FIG. 1 is a schematic block diagram of an implementation of a device for size or resolution processing according to some embodiments.

The details of various embodiments of the methods and systems are set forth in the accompanying drawings and the description below.

DETAILED DESCRIPTION

For purposes of reading the description of the various embodiments below, the following descriptions of the sections of the specification and their respective contents may be helpful. The following standard(s), including any draft versions of such standard(s), are hereby incorporated herein by reference in their entirety and are made part of the present disclosure for all purposes: MPEG-2, H.264 (AVC), H.265 (HEVC), VP.9, H.266 (VVC). Although this disclosure may reference aspects of these standard(s), the disclosure is in no way limited by these standard(s).

Standard dynamic range (SDR) and high dynamic range (HDR) media may include images, videos, and renderings, encoded in various formats for distribution, including high efficiency video coding (HEVC), one of the standards promulgated by the Society for Motion Picture and Television Engineers (SMPTE) and the Motion Picture Experts Group (MPEG), or other formats and standards. SDR, sometimes referred to as low dynamic range (LDR), refers to media content with a limited dynamic range for luminance values or brightness of pixels. SDR dynamic range is generally constrained by the bit depth or number of bits that may be used to represent the luminance of the pixels according to encoding and decoding standards (e.g. 8 bits per sample). For example, SDR media may have a dynamic range or ratio of luminance from the darkest possible pixel (full black) to the brightest possible pixel (full white) of 1:64. By contrast, the human eye can detect varying brightness over a ratio of approximately 1:1,000,000 (from very dim starlight to the full brightness of the sun, for example, though this may be much greater than necessary for typical media viewing).

High dynamic range (HDR) media standards provide more bits or a greater bit depth than SDR media (e.g., 12, 16, 24, 32 bits or more per sample). This allows a greater range in the image between white and black or bright and dark regions without introducing unacceptable amounts of contouring due to excessive quantization, with dynamic range ratios of 1:8192 or higher, including prototype displays that approach 1:200,000 dynamic range ratios. As a result, media may have higher contrast, darker dark sections and brighter bright sections.

Some embodiments of systems and method utilize a machine learning or artificial intelligence to provide changes for display resolution and size (e.g., for video super resolution). Conversions can be made in accordance with the standards discussed above in some embodiments. In some embodiments, the video signal is a digital signal represented in either YCbCr:Luma (Y) and Chroma (Cb and Cr) or RGB:R (red) G (green and B (blue) color spaces and a selected sampling format of 4:4:4 or 4:2:2 or 4:2:0. Also, video compression formats (e.g., MPEG-2, AVC, H.265, VP.9, H.266) can also be involved (e.g., for storage purposes). Conversions back and forth among all these formats are usually performed as needed.

To display the video signal on a given display, one of the last processing stages that is performed can be scaling which involves changing the number of input lines and input columns included with the digital video signal arriving at the display into a number of output lines and a number of output columns that can be different than the number of input lines and the input columns. The output lines and output columns may be dictated by a desired and available resolution output or size output over an interface such as HDMI or may represent the native pixel format of the display panel of a TV or monitor in some embodiments. The input lines, output lines, the input columns, and the output columns are generally integer positive numbers. Digital scaling can be used to convert each incoming video frame from its input lines and input columns to output lines and output columns for the display.

According to some embodiments, a device includes a first circuit configured to process video information for a resolution or scaling operation and provide first data, a second circuit configured to process the video information for the resolution or scaling operation and provide second data, and a third circuit configured to receive the first data and the second data and provide third data according to the resolution or scaling operation. The first circuit includes a first machine learning engine. A machine learning engine can refer to a circuit, model, data, or software that maps an input to an output. The model can be an artificial intelligence model. The input of an artificial intelligence model may be a multi-dimensional vector, each element representing a feature of a signal or data. The output of an artificial intelligence model may be another vector potentially in a different dimensional space. Artificial intelligence models or machine learning engines may include but are not limited to neural networks, convolutional neural networks, deep-learning models, transformer models, pre-trained generative transformer models, autoencoders, long-short term memory networks, recursive neural networks, support vector machines, nearest neighbor classifiers, or any other suitable artificial intelligence models. In some embodiments, the machine learning engine can be a different type of engine or model.

In some embodiments, the third circuit is a blender configured to blend the first data and the second data in response to a value of probability. In some embodiments, the value of probability relates a probability that a portion of the video information includes an invariant and is provided by a calculator. A calculator refers to a circuit, model, data, or software that determines a value or a factor in some embodiments. In some embodiments, the calculator receives the video information. A blender may refer to a circuit configured to receive two sources of data and provide output data in response to the two sources of data in some embodiments. The output can be a mix or blend of the input data based upon a function or other factors in some embodiments. A probability refers to a likelihood that a certain condition or outcome exists in some embodiments. In some embodiments, the calculator includes a second machine learning engine. In some embodiments, the calculator determines the value of probability using a distance to a plane. In some embodiments, the first circuit is configured to process the video information for a super resolution operation. A super resolution operation refers to any operation that increases resolution of an image in any form. Super resolution can make an image appear sharper and more detailed than an original input in some embodiments.

According to some embodiments, a system is configured to convert pixel data from a first resolution to a second resolution or form a first scale to a second scale. The system includes a first path comprising a machine learning engine, a second path comprising a calculator, and a third path comprising a converter. The calculator is configured to provide a value related to a likelihood of presence of an invariant. The system further includes an input configured to provide input pixel data to the first path, the second path, and the third path. The system further includes a blender configured to combine first output pixel data from the first path and second output pixel data from the third path in response to the value. A path may refer to a set of one or more steps, operations, stages, pipelines, etc. from an input to an output of the path in some embodiments. A converter refers to a circuit, model, data, or software that coverts an input in one form to an output in another form in some embodiments.

In some embodiments, the machine learning engine converts the input pixel data at a first, lower resolution to the first output pixel data at a second higher resolution. Resolution generally refers to the detail an image holds and can be measured in terms of pixels in some embodiments. Higher resolution indicates more detail and clarity in the image in some embodiments. Scale generally refers to a size of an image in some embodiments.

In some embodiments, the converter is a non-machine learning converter. In some embodiments, the converter is a linear converter. In some embodiments, the calculator uses a machine learning technique to provide the value. In other embodiments, the calculator uses a non-machine learning technique to provide the value. Linear converter refers to a circuit, model, data, or software that can transform values along a straight line, maintaining a constant rate of change (including no change at all) in some embodiments. The linear converter can employ mathematical operations such as multiplication and addition, for scale and resolution conversion in some embodiments.

According to some embodiments, a device includes a first circuit configured to process input data for a resolution or scaling operation and provide first output data. The first circuit includes a first machine learning engine. The device also includes a second circuit configured to process the input data for the resolution or scaling operation and provide second output data and a third circuit configured to receive the first output data and the second output data and provide third output data in response to a probability related to a presence of invariant data.

In some embodiments, the third circuit is a blender configured to blend the first output data and the second output data in response to a value of probability. In some embodiments, a value of the probability relates to a probability that a portion of the input data is invariant data. In some embodiments, the invariant data corresponds to a group of pixels in the input data having a constant luminance value. In some embodiments, the device further includes a calculator. The calculator includes a second machine learning engine configured to provide the probability. In some embodiments, the calculator can use non-machine learning techniques. In some embodiments, the device further includes a calculator configured to provide the probability using a distance to a plane in a group of pixels in the input data. In some embodiments, the first circuit is configured to process the input data for a super resolution operation. In some embodiments, the input data is in a vector space format. A vector space format generally refers to a structured representation used to describe vectors within a vector space in some embodiments.

In some embodiments, the input pixels have a finite size in space (for simplicity the size is equal to the unity in each direction), and an input grid is an array of points equally spaced at the distance of one in a two-dimensional array that represents the position of a center of each pixel. The input grid represents a rectangle. An output sampling grid can be defined that falls anywhere inside that rectangle in some embodiments. In some embodiments, the output sampling grid may extend outside the input sampling grid to some degree (e.g., when the output grid introduces a slight negative shift in the output image). In some embodiments, digital scaling is used to calculate the pixel value in an arbitrary chosen position (e.g., the position of interest). There are a number of systems and methods that can be used to determine the position of interest (e.g., zero order interpolation (taking the value of the closest existing pixel in the input), first order interpolation (taking the average of the closest existing pixels to the position of interest), and linear filtering (linearly interpolating input pixels on a vicinity of the position of interest)).

In some embodiments, systems and methods overcome limitations of linear interpolation associated with adding information required for a broader signal spectrum created by a higher sampling rate (e.g., up sampling—the number of output columns is greater than the number of input columns). In some embodiments, the systems and methods are capable of artificially adding information in the newly available spectrum while mitigating display quality reductions and stair-step artifacts associated with diagonal lines. In some embodiments, the systems and methods employ non-linear scaling techniques that learn to associate a given pattern in the input with a desired pattern in the output and populate the new space created in the frequency spectrum with information that is statistically correlated with the information in the existing portion of the frequency spectrum.

In some embodiments, on-chip machine learning based super-resolution scaling is achieved without involving an array of programmable parallel processors (e.g., graphics processing unites (GPUs)) and a data bus reading/writing data from the array into a DRAM memory. In some embodiments, the systems and methods employ solutions that do not require large areas of silicon, high power consumption, and large memory bandwidth to constantly move data in and out of the memory.

In some embodiments, a super-resolution operation processes invariant portions of the signal differently than non-invariant portions the signal. An invariant portion refers generally to a portion of an input signal for which the processing result is the same or nearly the same as the input signal in some embodiments. Invariants to the super-resolution operation do not change or do not change in a complex fashion when super resolution is applied, or is invariant to the super-resolution operation in some embodiments. Examples of invariants are flat areas (e.g., made of neighboring pixels of constant values) where the super-resolution operation would not need to change an aspect of the signal. Other examples of invariants to the super-resolution processing operations are ramps, or sinusoidal changes over a very large period. In some embodiments, a portion although not an invariant can be written as a sum of another signal and an invariant signal which can reduce the number of signals or amount of data that need to be processed and the number of processing operations.

In some embodiments, systems and methods treat the video signals as part of a vector space and process the vector space in a linear operation, thereby simplifying the processing of a two dimensional vector space. A vector x in the two dimensional space can be represented as:

$$x = a1 * v1 + a2 * v2 + \ldots + an * vn$$

with v1, v2, . . . vn representing a base to that space.
If f( ) is a linear operation in that space, then:

$$f(x) =$$

$$f(a1 * v1 + a2 * v2 + \ldots + an * vn) = a1 * f(v1) + a2 * f(v2) + \ldots an * f(vn)$$

For known n values of the f(v1), f(v2), . . . f(vn), the results f(x) for any x belonging to the vector space can be calculated by performing n multiplications and n−1 additions. The function f(x) can be implemented very efficiently in hardware in some embodiments. For non-linear functions, there are points in the vector space such that f(x)=x and those points are called invariants for the function f( ). Such a point can be referred to as invariant in relation to the processing function f( ) because f( ) maps the point into itself(e.g., there is not any processing required). The point is stationary in the sense that the point is not changing into anything else when the function f( ) is applied and a calculation is not required. When such an invariant point x0 has been identified, any new point y once f(y) is known will be equal to: f(x0+y)=f(x0)+f(y)=x0+f(y). In some embodiments, a machine learning engine is trained to calculate f(y), and f(x0+y) is calculated as the value x0+f(y), thereby reducing the number of elements that need to be resolved which requires a much smaller network and yet accomplishes the same results.

In accordance with a fundamental theory of signal processing, for a sampling period TO, the maximum frequency $\Omega 0$ that can be represented is $2*\pi/T0$ and by increasing the sampling rate to T1 as required by the need to display a digital image on a display with a larger number of lines and columns than the input video signal, the largest frequency that can be fit into the signal becomes $\Omega 1$ where:

$$\Omega 0 = 2 * \pi / T0 \tag{1}$$

$$\Omega 1 = 2 * \pi / T1 \tag{1}$$

$$T1 < T0; \Omega 1 > \Omega 0. \tag{3}$$

In some embodiments, systems and method are utilized to fill in the extra space created in the frequency domain, specifically to add information in the range of [$\Omega 0$, $\Omega 1$]. The information is added in the form of details in the picture and an increase in the sharpness, without significantly changing the low frequencies which give the overall impression of the content presented in the picture in some embodiments. In some embodiments, machine learning training calculates the programing parameters of a neural network that has input signals with a frequency content in the range [0, $\Omega 0$] and output versions of the same signals with frequencies in the range [0, $\Omega 1$]. At the end of the training, the programing parameters are calculated such that during the inference process for any signal with a content in the range of [0, $\Omega 0$] its counterpart in the range of [0, $\Omega 1$] is generated. The higher frequency signal is not unique and depends on the neural network and on its training in some embodiments.

In certain applications including but not limited to super-resolution, the information (e.g., video signal) in the range of [$\Omega 0$, $\Omega 1$] that needs to be predicted is very little if at all correlated with the direct current (DC) frequency, the frequencies close to the DC level, and the frequency components in the range [0, $\varepsilon$] with some values $\varepsilon$>0. In some embodiments, any signal in the range [0, $\varepsilon$] that are fixed points for certain applications can be subtracted from any signal, thereby significantly reducing the space of signals upon which the machine learning network is trained. The points can be added to the result of the inference at a later time in some embodiments. Each application has its own types of signals that represent invariants. For example, for super-resolution applications, ramps that are invariants can be subtracted from the signal and from the training set and be added to the result.

With reference to FIG. 1, an implementation of a device 200 can process conversions between formats, including but not limited to size and resolution formats. A device 200 is a computing device and can be part of a video processor, a set top box, a video router or distribution amplifier, a splitter, an X-Y interface, a switcher, a compositor, or any other type and form of appliance or computing device. Device 200 can be part of a server, desktop computer, laptop computer, tablet computer, wearable computer, smart phone, smart television, or any other type and form of device. Device 200 may include additional components including one or more processors, one or more memory units, one or more network interfaces, hardware circuits, one or more input/output devices such as displays or keyboards, or any other type and form of device. The processors may include a microprocessor, an application-specific integrated circuit (ASIC), a field-programmable gate array (FPGA), dedicated hardware/login circuits, programmable logic, etc., or combinations thereof. The memory units may include, but are not limited to, electronic, optical, magnetic, or any other storage or transmission device capable of providing a processor with program instructions. The memory units may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The memory units may include one or more applications, services, routines, servers, daemons, or other executable logics for executing applications and for requesting and displaying media files. These applications, services, routines, servers, daemons, or other executable logics may be integrated such that they may communicate with one another or be enabled to make calls to routines of each other.

Device 200 includes an input interface 202 and/or output interface 205 for receiving and providing graphic or video signals, including but not limited to data, images, videos, and renderings. In some implementations, an input interface 202 and/or output interface 205 includes an HDMI interface, component video interface, DVI interface, DisplayPort interface, or other such video interface. In some implementations, an input interface 202 and/or output interface 205 includes a data interface, such as a network interface, Ethernet port, 802.11 (WiFi) interface, Blue Tooth interface, cellular interface, satellite interface, HDMI interface, or any other type and form of data interface. Thus, device 200 may receive a first item of media in a first format (e.g., video or graphic information) via any type of input, may process and convert the first item of media to a second format, and may provide the first item of media in the second format via any type of output. In some implementations, device 200 may generate media internally, such as when generating a rendered image or video, and thus, input interface 202 may include an interface to another application executed by device 200 (e.g. a rendering application, video game, media player, or any other such application). Device 200 can be used in various applications including but not limited to medical imaging, satellite and aerial imaging, consumer photography, smartphone camera imaging, simulations, entertainment, video streaming and surveillance, and improving the quality of video feeds, augmented reality imaging, virtual reality imaging, etc.

Device 200 includes a media processor 206, which may be implemented in hardware circuitry, software executed by a processor or processors of device 200, or a combination of hardware and software. For example, in one implementation, media processor 206 includes an ASIC circuit or other circuit for converting a media bitstream from a first format to a second format, and may consult a LUT 214 including scaling factors or luminance mapping ratios stored in a memory unit of device 200. Media processor 206 includes a vector space converter 208 in some embodiments. Device 200 and/or converter 208 and/or component mapping converter 210 includes circuitry, software, or a combination of circuitry and software for modifying pixel color components, sizes, luminance values, values in a bitstream, etc. according to the operations and methods discussed herein.

Vector space converter 208 can be a stand-alone device. Device 200 and/or converter 208 can be provided on an IC substrate or multichip module in some embodiments. Although vector space converter 208 is described herein, any type of converters can be utilized. In some embodiments, vector space converter 208 can be any circuit for converting an input signal or data to an output signal or data to provide resolution or scaling operations.

In some embodiments, vector space converter 208 is configured to implement a machine learning based scaling and/or super-resolution operations in an efficient way. In some embodiments, vector space converter 208 is implemented in hardware or mostly hardware as opposed to a mostly software solution. In some embodiments, vector space converter 208 is configured to split the signal into an invariant and non-invariant portion and treat the portions separately and blending treated portions together (e.g., based on probability), thereby allowing for a smaller machine learning network that performs as well as a larger network that does not use such converter 208. In some embodiments, vector space converter 208 advantageously identifies input signals (e.g., video information) at an input 204 (e.g. a majority of the input signals) that have low spatial frequencies for conversion using a non-machine learning method (e.g., a linear methods). In some embodiments, vector space converter 208 is configured to identify those input signals statistically and blend results of the machine learning and non-machine learning operations. The results are blended in accordance with a probability calculated at the same time with processing the results of the machine learning and non-machine learning operations in some embodiments. In some embodiments, vector space converter 208 is configured to provide a constant output for flat areas of the input signal using the non-machine learning operations, thereby avoiding machine learning operations and training for those areas.

In some embodiments, vector space converter 208 is configured to add information in a frequency range. The frequency range can be of ¼ to ½ units (e.g., pixels) in some embodiments. The added information may be different than what was in the initial scene (e.g., increased video resolution). If the input signal transitions from a minimum value to a maximum value over a range of 2 pixels, there is a transition from minimum to maximum over a range of 4 pixels after plain linear scaling. In some embodiments, that transition will be made again over 2 pixels, giving the human eye the same level of perception relative to the resolution of the display. In some embodiments, vector space converter 208 is configured to add information in response to pairs of signals as input and to provide a desired output where transitions over 2 pixels in the input are associated with transitions over 2 pixels in the output. In some embodiments, vector space converter 208 uses network training to that association. The network training can derive high probability that when a given input is detected, the desired counterpart signal is the one being associated with as input to the training set. In some embodiments, a neural network structure provides the weights and biases for the association that result from the process of training.

Figure 2:
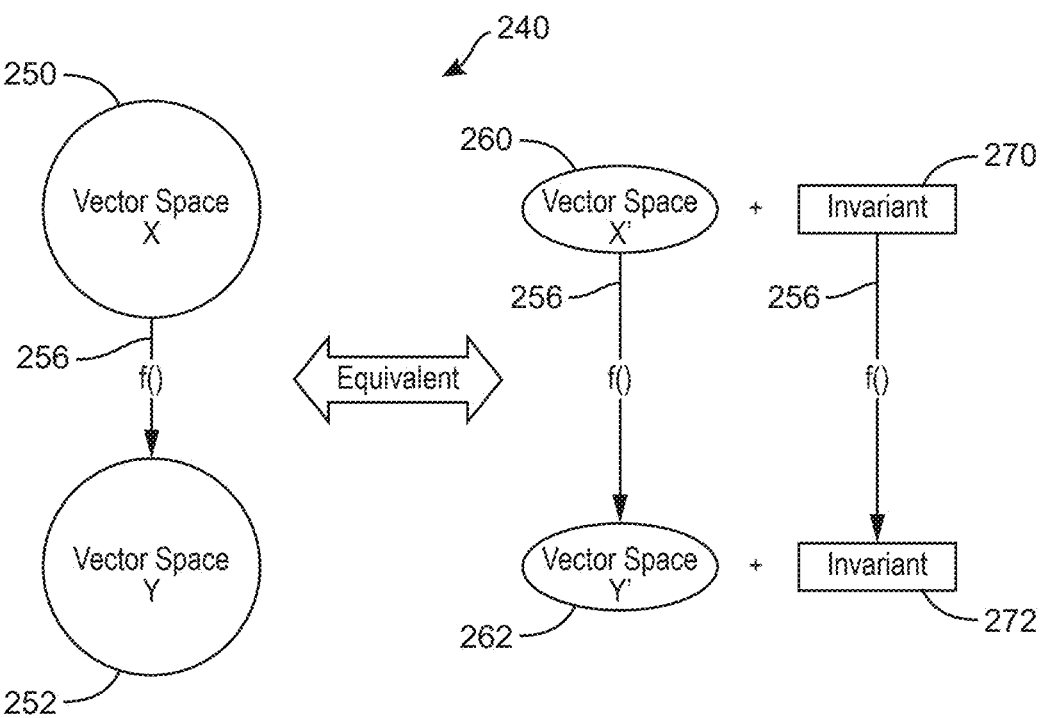
FIG. 2 is a schematic drawing of video information in a vector space format for processing by the computing device illustrated in FIG. 1 according to some embodiments.

With reference to FIG. 2, an exemplary diagram 240 includes an input vector space X 250 and an output vector space Y 252 which is a function f( ) 256 of input vector space 250. Vector space converter 208 (FIG. 1) applies the same or an equivalent function to function f( ) 256 to input vector space X 250 to achieve output vector space 252 for a super resolution operation in some embodiments. In some embodiment, input vector space X 250 can be written in an equivalent as a sum of another input vector space X' 260 and a set of fixed points or input invariants 270 for function f( ) 256. Given that $f(X)=f(X'+invariant)=f(X')+f(invariant)$, function f( ) 256 can be applied to input vector space X' 260 and invariants 270 separately, thereby making mapping much easier to implement. For example, the function 256 is applied to input invariants 270 to achieve output invariants 272. Once the output vector space Y' 262 is calculated for input vector space X' 260, the output can be determined by adding an offset (e.g., output invariants 272) to the output vector space Y' 262, thereby reducing the complexity of the problem by recognizing that output vector space f(Y) 252 is a sum of f(X') and f(invariant). Constant fields and ramps are input invariants 270 in some embodiments. Ramps can have various slopes and orientations and can be represented as geometric planes in a variety of orientations.

Figure 3:
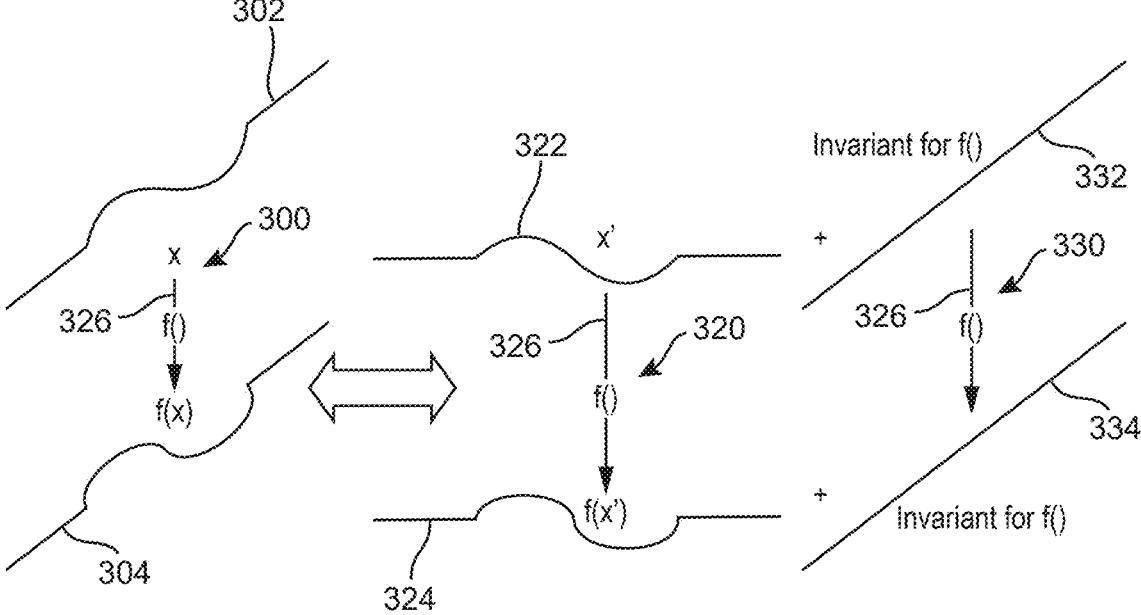
FIG. 3 is a schematic drawing of an exemplary graphic representation of video information for processing by the computing device illustrated in FIG. 1 according to some embodiments.

With reference to FIG. 3, an exemplary graphical diagram 300 includes an input signal x 302 and an output signal f(x) 304 which is a function f( ) 326 of input signal 302. Vector space converter 208 (FIG. 1) applies the same or an equivalent function to function f( ) 326 to input signal x 302 to achieve output signal f(x) 304 for a super resolution operation in some embodiments. In some embodiments, input signal x 302 can be written in an equivalent as a sum of another input signal x' 322 and a set of fixed points or input invariants 332 for function f( ) 326. Given that $f(x)=f(x'+invariant)=f(x')+f(invariant)$, function f( ) 326 can be applied to input signal x' 322 and invariants 332 separately, thereby making mapping much easier to implement. For example, the function 326 is applied to input invariants 332 to achieve output invariants 334. Once the output signal f(x') 324 is calculated for input signal x' 322, the output for can be determined by adding an offset (e.g., output invariants 334) to the output signal f(x') 324, thereby reducing the complexity of the problem by factor of 1024 by recognizing that output signal f(x) 304 is a sum of f(x') and f(invariant).

Figure 4:
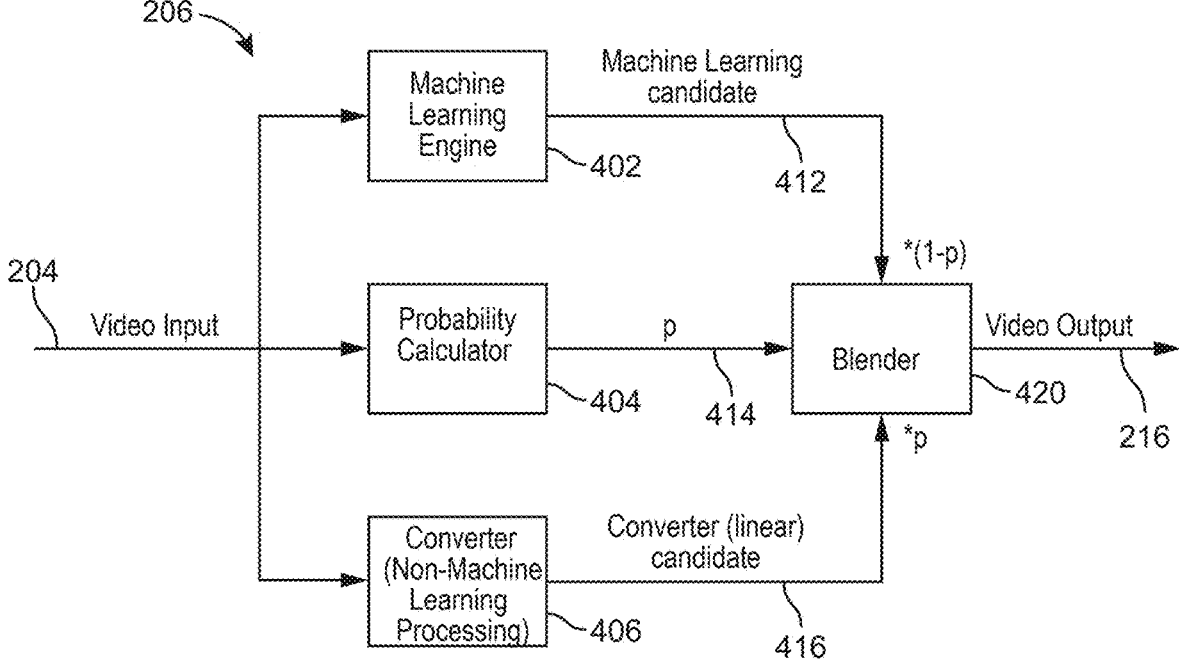
FIG. 4 is a schematic block diagram of an implementation of a vector space converter for the device illustrated in FIG. 1 according to some embodiments.

With reference to FIG. 4, an exemplary vector space converter 208 can be used in device 200. Vector space convertor 208 is coupled to an input 204 or input interface 202 (FIG. 1) for receiving graphic or video signals, including but not limited to data, images, videos, and renderings (e.g. input signal x 302 or input vector space X 250). Vector space converter 208 includes a machine learning inference engine 402, a probability calculator 404, a converter 406, and a blender 420. Machine learning inference engine 402, probability calculator 404, and converter 406 are each coupled to input 204. Blender 420 is coupled to an output 216 or output interface 205 (FIG. 1) for providing graphic or video signals, including but not limited to data, images, videos, and renderings (e.g. an output signal x 302 plus invariants 334 or output vector space Y' 250 plus invariants 272). Blender 420 is coupled to receive a value for probability p from calculator 404 at an output 414, data or an output signal from converter 406 at an output 416 and data or an output signal from engine 402 at an output 412. Components that are coupled together may include intervening components.

Machine learning inference engine 402 is a circuit configured to convert digital images or video using machine learning techniques. Machine learning inference engine 402 can be any type of machine learning network that is trained for the operations described herein. The machine learning network can be a feed forward network, a recurrent neural network, a convolutional neural network (CNN) (e.g., a super-resolution CNN (SRCNN), very deep super-resolution (VDSR) CNN, etc.), a generative adversarial network (GANs), a super-resolution (SRGAN), a transformer network, or a graph neural network in some embodiments.

Converter 406 can employ filters and/or algorithms to provide conversion operations as described herein. Converter 406 can be any circuit for providing linear filtering (e.g., Gaussian, Laplacian, etc.), single-image super-resolution (SISR), interpolation-based resolution or scaling methods (e.g., bilinear, bicubic, or spline interpolation which estimate new pixel values based on surrounding pixels), and/or frequency domain processing (e.g., Fourier transform, wavelet transform, etc.) ins some embodiments. In some embodiments, converter 406 is any type of non-machine learning engine for providing resolution or scaling operations.

Calculator 404 is a circuit configured to provide a value for probability p of an invariant condition in the input signal. Calculator 404 can be any type of machine learning network that is trained for the operations described herein. In some embodiments, calculator is a non-machine learning device. The machine learning network can be a feed forward network, a recurrent neural network, or a convolutional neural network (CNN) in some embodiments. Calculator 404 can be a graphics processor configured to calculate the closest plane to a window of pixels to determine probability in some embodiments. Various configurations can be used to determine probability.

In some embodiments, a video input is fed simultaneously from input 204 on three paths: a machine learning processing path including machine learning inference engine 402 having output 412, a non-machine learning processing path including converter 406 having output 416, and a probability path including calculator 404 having output 414. Calculator 404 is configured to calculate the value of probability p of the input signal being an invariant for the given processing function (e.g., for super-resolution or scaling). In some embodiments, vector space converter 208 avoids precisely calculating the invariant in the input signal x=x'+invariant. In some embodiments, engine 402 applies a function f to the input signal and converter 406 provides the function g to the input signal. Given that functions f and g are two functions implementing the same processing (e.g., super-resolution) on input signal x, for every invariant the processing function are $f(x)=f(x'+invariant)=f(x')+f(invariant)$ and $g(x)=g(x'+invariant)=g(x')+g(invariant)$ and f(invariant) is equal to (invariant) and f(x') is not equal to g(x'). If the probability of the representation of x as having an invariant is p and the desired output would be g(x)+invariant then taking the weighted sum provides that the blender 420 provides the output signal or data as $(1-p)*f(x)+p*g(x)=(1-p)*f(x')+(1-p)*(invari-$ ant)+p\*g(x')+p\*(invariant)=(1−p)\*f(x')+p\*g(x')+invariant. Therefore, the invariant (which is dominant in this case) is preserved and the desired value g(x) is weighted high with p (given p is calculated correctly) and the wrong value in this case f(x') is diminished. Generally, for processing functions, such, as super-resolution, the invariants can be difficult to re-create by a machine learning engine. Accordingly and in some embodiments, vector space converter 208 does not increase the complexity to the machine learning techniques by requiring that the techniques do not add any information onto the invariant and instead detects with a good probability of those cases that are hard for machine learning to process correctly and that are easier for non-machine learning methods. Vector space converter 208 not only improves the behavior on the invariants but also improves the behavior everywhere else, because training can be focused only on inputs that do not have signals with invariants (e.g., under the control of the system designer).

Figure 5:
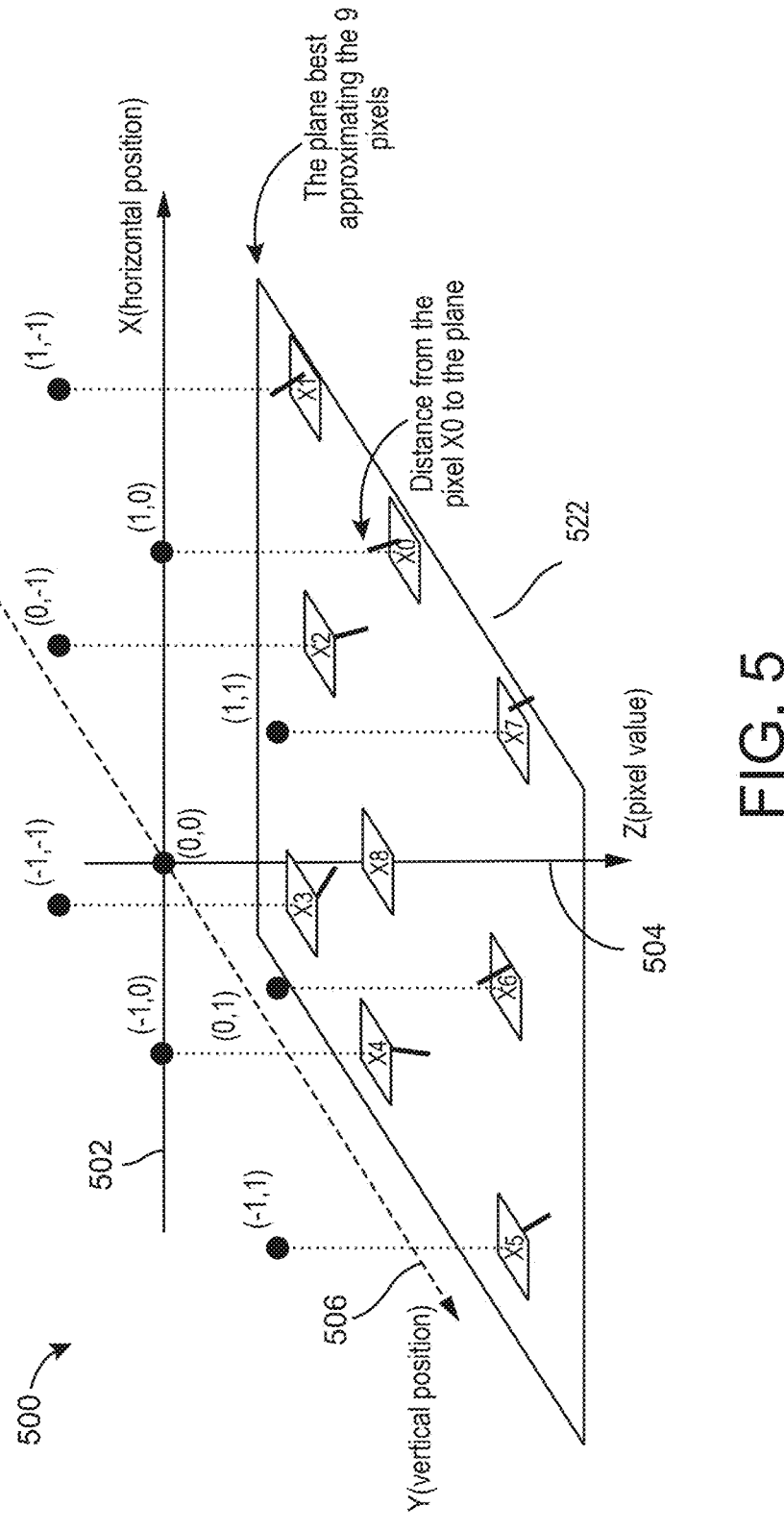
FIG. 5 is a schematic drawing of an exemplary graphic representation of a pixel in the video information processed by the device illustrated in FIG. 1 according to some embodiments.

With reference to FIG. 5, a 3 dimensional graph 500 includes an X axis 502, a Y axis 506 and a Z axis 504. Points or pixels X0, X1, X2, X3, X4, X5, X6, X7, and X8 are disposed in a plane 522 that approximates the nine pixels X0, X1, X2, X3, X4, X5, X6, X7, and X8. Other sizes (e.g., window sizes defined by the number of pixels) can be utilized. Detecting plane 522 can be used to detect an invariant. For example, during the scaling and/or super-resolution operations, a sampling point inside a sampling grid can be taken along with the nine closest pixels to that point (e.g., pixels X0, X1, X2, X3, X4, X5, X6, X7, and X8) and the location of those pixels with respect to a plane (e.g., plane 522) can be determined using coordinates. The plane that gives the minimum distance to pixels X0, X1, X2, X3, X4, X5, X6, X7, and X8 can be determined (in the Z axis 504) dimension. A value of probability p can be determined as the maximum distance of the distance of each the pixels X0, X1, X2, X3, X4, X5, X6, X7, and X8 to that plane (e.g. after normalizing an overall maximum distance to 1). The plane can be slanted, vertical, horizontal, etc. Calculator 404 can employ plane based distance detection to determine the values of probability p in some embodiments. Other techniques (e.g., filtering, machine learning, etc.) can be used to determine values of probability p.

Figure 6A:
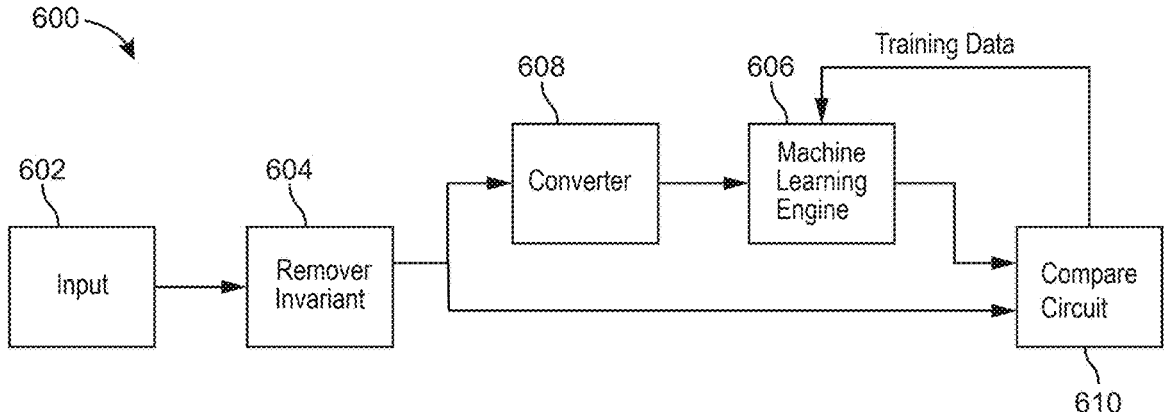
FIG. 6A is a schematic block diagram of an implementation of a training system for a machine learning processing engine of the vector space converter illustrated in FIG. 4 according to some embodiments.

With reference to FIG. 6A, a system 600 can be used to train a machine learning engine 606 (e.g., machine learning engine 402). System 600 includes an input 602 for receiving graphic or video signals, including but not limited to data, images, videos, and renderings, an invariant remover 604, machine learning engine 606, a converter 608 (e.g., downscaler), and a compare circuit 610. In some embodiments, invariant remover 604 removes invariants from input data and provides the input data with invariant data removed to engine 606 and converter 608. Converter 608 is configured to perform a conversion (e.g., down scaling or infra resolution) according to a non-machine learning algorithm. Engine 606 is configured to perform an inverse of the conversion (e.g., up scaling or super resolution) according to a machine learning technique. The results are compared by compare circuit 610 to the original input signal with the invariants removed and used to train machine learning engine 606.

Invariant remover 604 can be any device for removing invariant data. In some embodiments, invariant remover 604 is a high pass digital filter. Converter 608 is a downscaler and can be any device that reduces the resolution of a video information in some embodiments. Converter 608 can resample the video frames using nearest-neighbor, bilinear, and/or bicubic interpolation and filtering in some embodiments. Compare circuit 610 compares the signal from invariant remover 604 and engine 606 and provides training data to engine 606. System 600 can apply an iterative and multi-step process over multiple samples of input data to produce the training data for engine 606 so that the compare circuit 610 detects smaller differences between the results of engine 606 and invariant remover 604.

Figure 6B:
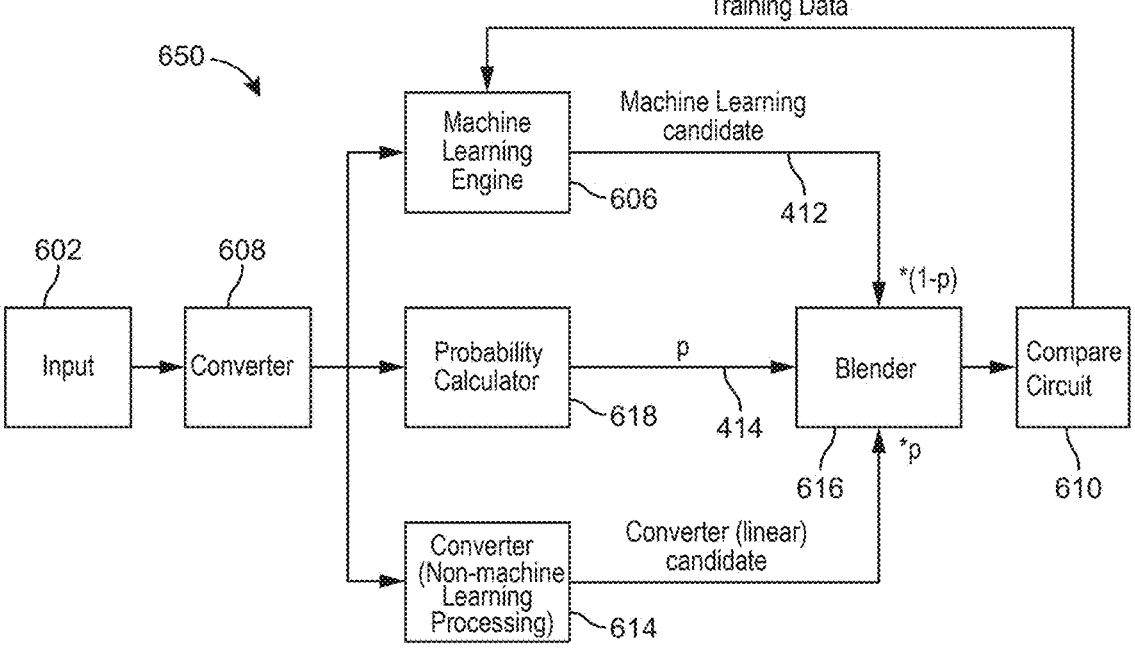
FIG. 6B is a schematic block diagram of an implementation of a training system for a machine learning processing engine for the vector space converter illustrated in FIG. 4 according to some embodiments.

With reference to FIG. 6B, a system 650 can be used to train a machine learning engine 606 (e.g., machine learning engine 402) and is similar to system 600. System 650 includes input 602 for receiving graphic or video signals, including but not limited to data, images, videos, and renderings, machine learning engine 606, converter 608 (e.g., downscaler), calculator 618 (e.g., similar to calculator 404), blender 616 (e.g., similar to blender 420) and a compare circuit 610. System 600 can apply an iterative and multi-step process over multiple samples of input data to produce the training data for engine 606 so that the compare circuit 610 detects smaller differences between the results of engine 606 and input 602.

Figure 7:
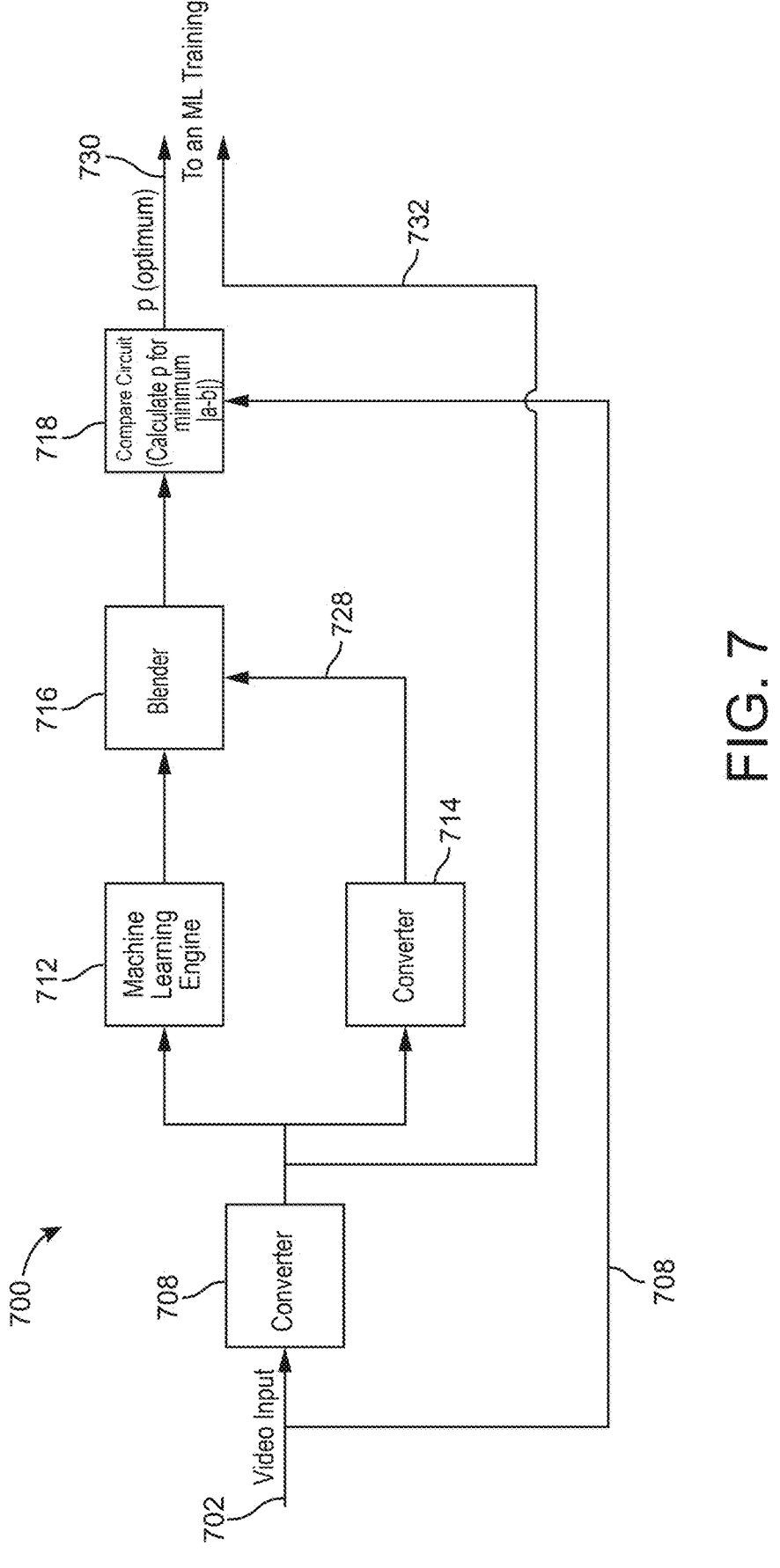
FIG. 7 is a schematic block diagram of an implementation of a training system for a machine learning probability engine for the vector space converter illustrated in FIG. 4 according to some embodiments.

With reference to FIG. 7, a system 700 can be used to train a machine learning engine (e.g., for calculator 404 (FIG. 4)). System 700 includes an input 702 for receiving graphic or video signals, including but not limited to data, images, videos, and renderings, a converter 708 (e.g., similar to converter 608), a machine learning engine 712 (e.g., similar to engine 402), a converter 714 (e.g., similar to converter 406), a blender 716 (e.g., similar to blender 420, a compare circuit 718 (e.g., similar to compare circuit 610 and an output 730. In some embodiments, converter 704 downscales the input data and provides the downscaled input data to engine 712 and converter 714. The input data serves as the known desired output in some embodiments. Converter 714 is configured to perform the conversion (e.g., scaling or resolution) according to a non-machine learning algorithm and upscale the data to its original form. Engine 712 is configured to perform the conversion (e.g., scaling or resolution) according to a machine learning technique and upscale the data to its original form. The results from converter 714 and engine 712 are blended by blender 716 (e.g., linear blending circuit).

Blender 716 produces results using values of the probability p over a range (e.g., 1-256 normalized over a range of 0:1). The output of the blender 716 is provided to compare circuit 718 which determines the optimum or suitable value for the value of probability p by comparing the input data to the output date at each value of p. This information can be used to train a machine learning engine for calculator 404 where input data is associated or mapped to a value of the probability p. System 650 can apply an iterative and multi-step process over multiple samples of input data to produce the training data for calculator 404 (FIG. 4) so that the compare circuit 718 detects smaller differences between the results from blender 716 and input 702.

Device 200 can include any hardware, logic circuitry, neural networks, or processor that responds to and processes instructions fetched from a memory. In some embodiments, a microprocessor unit, a graphics processor, data processor, etc. is part of device 200. The memory may be one or more memory circuits capable of storing data, such as any type or variant of Static random access memory (SRAM), Dynamic random access memory (DRAM), Ferroelectric RAM (FRAM), NAND Flash, NOR Flash and Solid State Drives (SSD). Various buses may be used to connect components of device 400.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

We claim:

1. A device, comprising:
a first circuit configured to process video information for a resolution or scaling operation and provide first data, the first circuit comprising a first machine learning engine;
a second circuit configured to process the video information for the resolution or scaling operation and provide second data;
a calculator configured to provide a value of probability that at least a portion of the video information comprises an invariant; and
a third circuit configured to receive the first data, the second data, and the value of probability, and blend the first data and the second data according to the value of probability.

2. The device of claim 1, wherein the third circuit comprises a blender configured to blend the first data and the second data in response to the value of probability.

3. The device of claim 1, wherein the calculator is configured to receive the video information.

4. The device of claim 3, wherein the calculator comprises a second machine learning engine.

5. The device of claim 1, wherein the calculator is configured to determine the value of probability using a distance to a plane.

6. The device of claim 1, wherein the first circuit is configured to process the video information for a super resolution operation.

7. A system for converting pixel data from a first resolution to a second resolution or from a first scale to a second scale, the system comprising:
a first path comprising a machine learning engine;
a second path comprising a calculator, the calculator configured to provide a value related to a likelihood of presence of an invariant using a distance to a plane;
a third path comprising a converter;
an input configured to provide input pixel data to the first path, the second path, and the third path; and
a blender configured to combine first output pixel data from the first path and second output pixel data from the third path in response to the value.

8. The system of claim 7, wherein the machine learning engine is configured to convert the input pixel data at a first, lower resolution to the first output pixel data at a second higher resolution.

9. The system of claim 7, wherein the converter comprises a non-machine learning converter.

10. The system of claim 7, wherein the converter comprises a linear converter.

11. The system of claim 7, wherein the calculator is configured to use a machine learning technique to provide the value.

12. A device, comprising:
a first circuit configured to process input data for a resolution or scaling operation and provide first output data, the first circuit comprising a first machine learning engine;
a second circuit configured to process the input data for the resolution or scaling operation and provide second output data;
a calculator configured to provide a value of probability that at least a portion of the input data comprises invariant data; and
a third circuit configured to receive the first output data, the second output data, and the value of probability, and blend the first output data and the second output data according to the value of probability.

13. The device of claim 12, wherein the third circuit comprises a blender configured to blend the first output data and the second output data in response to the value of probability.

14. The device of claim 12, wherein the invariant data corresponds to a group of pixels in the input data having a constant luminance value.

15. The device of claim 12, wherein the calculator comprises a second machine learning engine configured to provide the value of probability.

16. The device of claim 12, wherein the calculator is configured to provide the probability using a distance to a plane in a group of pixels in the input data.

17. The device of claim 12, wherein the first circuit is configured to process the input data for a super resolution operation.

18. The device of claim 12, wherein the input data is in a vector space format.

* * * * *